(12) United States Patent
Kinugawa et al.

(10) Patent No.: US 10,904,930 B2
(45) Date of Patent: Jan. 26, 2021

(54) COMMUNICATION SYSTEM FOR WORKING MACHINE, MOBILE TERMINAL, AND COMMUNICATION PROCESSING METHOD FOR WORKING MACHINE

(71) Applicant: KUBOTA CORPORATION, Osaka (JP)

(72) Inventors: Ryosuke Kinugawa, Osaka (JP); Keisuke Egashira, Osaka (JP); Keisuke Miura, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/225,612

(22) Filed: Dec. 19, 2018

(65) Prior Publication Data
US 2019/0200403 A1  Jun. 27, 2019

(30) Foreign Application Priority Data

Dec. 21, 2017  (JP) ................................ 2017-245208

(51) Int. Cl.
| | |
|---|---|
| *H04W 76/11* | (2018.01) |
| *H04W 40/24* | (2009.01) |
| *H04B 17/318* | (2015.01) |
| *H04W 88/02* | (2009.01) |
| *H04W 4/80* | (2018.01) |

(52) U.S. Cl.
CPC .......... *H04W 76/11* (2018.02); *H04B 17/318* (2015.01); *H04W 4/80* (2018.02); *H04W 40/244* (2013.01); *H04W 88/02* (2013.01)

(58) Field of Classification Search
CPC .... H04B 17/318; H04W 40/244; H04W 4/80; H04W 76/11; H04W 88/02
See application file for complete search history.

(56) References Cited

U.S. PATENT DOCUMENTS

| | | | |
|---|---|---|---|
| 9,363,318 B2* | 6/2016 | Nelson | .................. H04L 67/125 |
| 2014/0220883 A1* | 8/2014 | Emigh | .................. H04H 20/61 |
| | | | 455/3.01 |
| 2015/0341440 A1 | 11/2015 | Nelson et al. | |
| 2016/0128049 A1* | 5/2016 | Phillips-Lubimiv | .... H04L 67/12 |
| | | | 370/329 |

(Continued)

FOREIGN PATENT DOCUMENTS

| | | |
|---|---|---|
| JP | 2015-65903 A | 4/2015 |
| JP | 2017-181108 A | 10/2017 |

*Primary Examiner* — Kashif Siddiqui
(74) *Attorney, Agent, or Firm* — Greenblum & Bernstein, P.L.C.

(57) ABSTRACT

A communication device for a working machine disposed on the working machine and configured to be connected to a mobile terminal, includes an identifier setting circuit configured to set at least one of a first program identifier and a second program identifier, and a first communicating circuit configured to transmit, to the mobile terminal, the first program identifier set by the identifier setting circuit with a first beacon and the second program identifier set by the identifier setting circuit with a second beacon, the first communicating circuit being configured to transmit the second beacon to the mobile terminal while the mobile terminal executes a first program after receiving the first beacon, the first program corresponding to the first program identifier being included in the first beacon.

20 Claims, 8 Drawing Sheets

(56) References Cited

U.S. PATENT DOCUMENTS

2017/0094484 A1* 3/2017 Li ............................ H04L 51/24
2019/0132815 A1* 5/2019 Zampini, II ......... H04W 64/003
2019/0200224 A1* 6/2019 Kinugawa ....... H04W 12/00409
2019/0200276 A1* 6/2019 Kinugawa ............. H04W 88/02
2019/0200277 A1* 6/2019 Kinugawa ............... H04W 4/40

* cited by examiner

| iBeacon UUID (Application identifier) | Application software |
|---|---|
| 5A3D | 1st application |
| 5A3E | 2nd application |
| ... | ... |

FIG.2C

| ServiceUUID (Program identifier) | Program |
|---|---|
| 12BC8 | 1st application |
| 12BC9 | 2nd application |
| ⋮ | ⋮ |

COMMUNICATION SYSTEM FOR WORKING MACHINE, MOBILE TERMINAL, AND COMMUNICATION PROCESSING METHOD FOR WORKING MACHINE

CROSS-REFERENCE TO RELATED APPLICATIONS

The present application claims priority under 35 U.S.C. § 119 to Japanese Patent Application No. 2017-245208, filed Dec. 21, 2017. The content of this application is incorporated herein by reference in their entirety.

BACKGROUND OF THE INVENTION

Field of the Invention

The present invention relates to a communication device for a working machine, a mobile terminal, a communication system for the working machine, and a communication processing method for the working machine.

Description of Related Art

U.S. Pat. No. 9,363,318 is previously known as a technique for performing communication between a vehicle and a mobile terminal. In U.S. Pat. No. 9,363,318, an application identifier used for identifying an application is transmitted from the vehicle computer side to the mobile terminal, and the mobile terminal that has received the application identifier determines an application corresponding to the application identifier, then after activating the application, the mobile terminal side transmits data relating to the application to the vehicle computer.

SUMMARY OF THE INVENTION

A communication device for a working machine disposed on the working machine and configured to be connected to a mobile terminal, includes an identifier setting circuit configured to set at least one of a first program identifier and a second program identifier, and a first communicating circuit configured to transmit, to the mobile terminal, the first program identifier set by the identifier setting circuit with a first beacon and the second program identifier set by the identifier setting circuit with a second beacon, the first communicating circuit being configured to transmit the second beacon to the mobile terminal while the mobile terminal executes a first program after receiving the first beacon, the first program corresponding to the first program identifier being included in the first beacon.

A mobile terminal to be connected to a plurality of communication devices disposed on working machines, includes a second communicating circuit to receive at least a first beacon and a second beacon other than the first beacon, the first beacon being one of a plurality of beacons transmitted from the communication devices, and a calculating circuit to execute a first program corresponding to a first program identifier included in the first beacon and to execute a second program corresponding to a second program identifier included in the second beacon.

A communication system for a working machine disposed on the working machine, includes a plurality of communication devices to transmit beacons each of which includes at least one of a first program identifier and a second program identifier; and a mobile terminal to receive the beacon, the mobile terminal being configured to execute a first program corresponding to a first program identifier included in the first beacon after receiving at least a first beacon that is one of a plurality of beacons transmitted from the communication devices, and execute a second program corresponding to the first program identifier included in a second beacon when receiving the second beacon while the first program is executed, the second beacon being other than the first beacon.

A communication processing method for working machines which connects a plurality of communication devices disposed on a plurality of working machines to a mobile terminal configured to connect to the plurality of communication devices, includes transmitting a first beacon from a first communication device of the plurality of communication devices, executing a first program when the mobile terminal receives the first beacon, the first program corresponding to a first program identifier included in the first beacon, transmitting, to the mobile terminal, a second beacon from a second communication device of the communication devices other than the first communication device while the mobile terminal activates the first program, and executing a second program when the mobile terminal receives the second beacon, the second program corresponding to a second program identifier included in the second beacon.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with reference to the drawings as appropriate.

Figure 5:
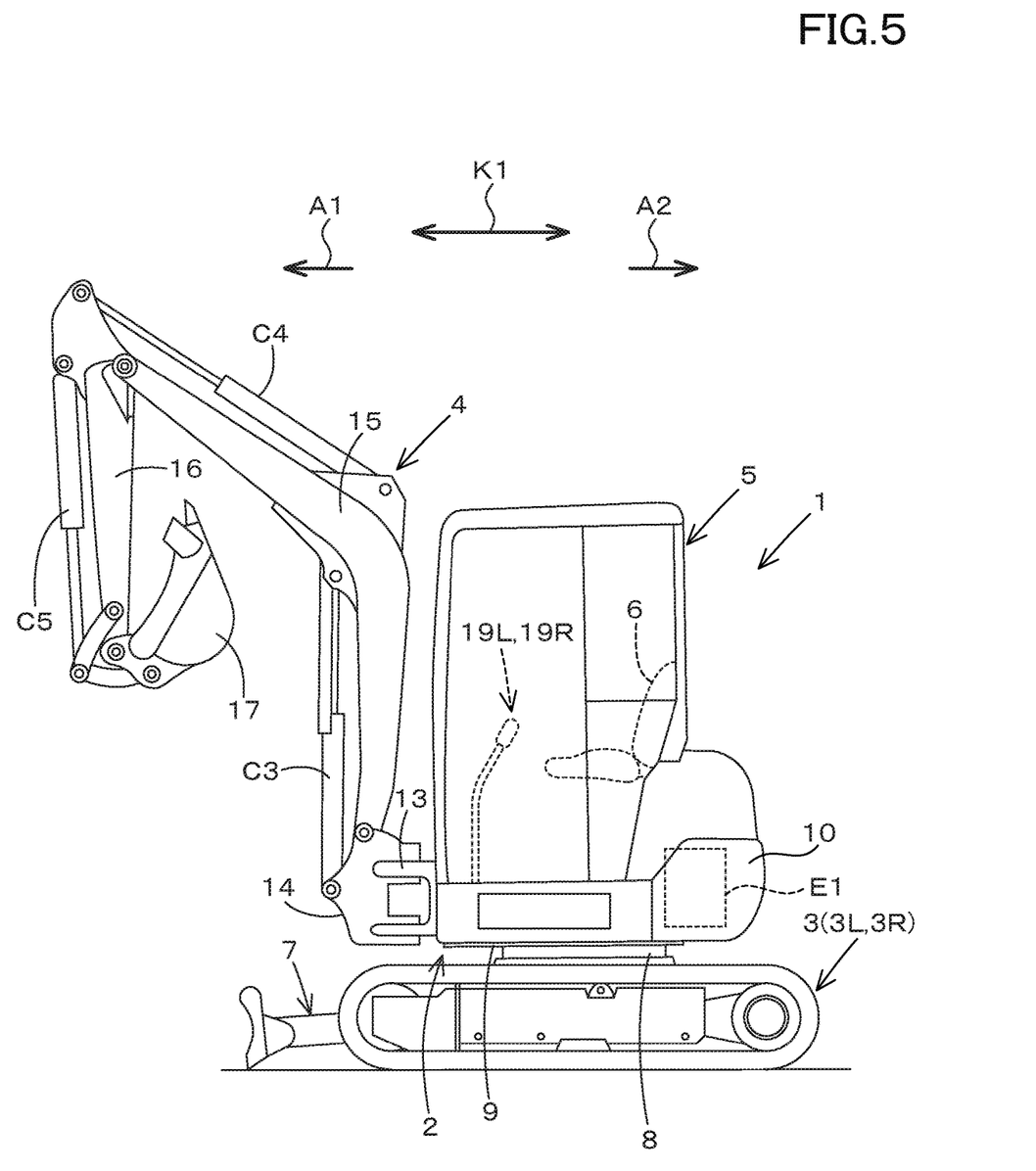
FIG. 5 is a schematic view illustrating a side surface of a working machine.

FIG. 5 is a schematic view showing a side surface of the overall configuration of the working machine 1 according to the present embodiment. In the present embodiment, a backhoe which is a swiveling working machine is exemplified as the working machine 1. In this embodiment, although a backhoe is exemplified as the working machine 1, the working machine may be an agricultural machine such as a tractor, a combine, and a rice transplanter, a compact track loader, a skid steer loader, or the like.

The overall configuration of the working machine 1 will be described at first.

As shown in FIG. 5, the working machine 1 includes a machine body 2, a traveling device 3, and a work device 4. A cabin 5 is mounted on the machine body 2. An operator seat 6 is provided in the interior of the cabin 5.

In this embodiment, the front side of a driver (the operator) seated on the operator seat of the working machine 1 (the direction indicated by an arrowed line A1 in FIG. 5) is defined as the front, the rear side of the operator (the direction indicated by an arrowed line A2 in FIG. 5) is defined as the rear, the left side of the operator (on the front surface side of FIG. 5) is defined as the left, and the right side of the operator (on the back surface side of FIG. 5) is defined as the right.

In addition, the horizontal direction which is a direction orthogonal to the front-back direction K1 is referred to as the machine width direction in the explanation. The direction from the center portion of the machine body 2 toward the right portion in the width direction of the machine body 2 will be referred to as a machine outward direction, and the direction from the center portion of the machine body 2 toward the left portion in the width direction of the machine body 2 also will be referred to as the machine outward direction.

In other words, the machine outward direction is equivalent to the machine width direction, and means a direction separating away from the center of the machine body 2 in the machine width direction.

The following explanation will be made defining a direction opposite to the machine outward direction as the machine inward direction. In other words, the machine inward direction is equivalent to the machine width direction, and means a direction approaching the center of the machine body 2 in the machine width direction.

As shown in FIG. 5, the traveling device 3 includes a traveling body 3L and a traveling body 3R, the traveling body 3L is provided on the left side, and the traveling body 3R is provided on the right side. The traveling body 3L and the traveling body 3R are each constituted of crawler type traveling devices. A dozer device 7 is attached to the front portion of the traveling device 3. The dozer device 7 is configured to be vertically move (raise and lower the blade) by the stretching and shortening of the dozer cylinder.

The machine body 2 is a turn base (a swiveling base), and is supported on the traveling device 3 so as to be freely turned about a longitudinal axis (an axis extending in the vertical direction) via a turn bearing 8. The machine body 2 is configured to be pivotally driven by a turn motor consisting of a hydraulic motor (a hydraulic actuator). The machine body 2 has a weight 10 and a turn base plate 9 configured to turn about the vertical axis.

The turn base plate 9 is formed of a steel plate or the like, and is connected to the turn bearing 8. The weight 10 is provided at the rear portion of the machine body 2. A prime mover E1 is mounted on the rear portion of the machine body 2.

The prime mover E1 is a diesel engine. Meanwhile, the prime mover E1 may be an electric motor or may be a hybrid type having the diesel engine and the electric motor.

The machine body 2 has a support bracket 13 at the center of the front portion of the machine body 2 in the machine width direction, being arranged slightly rightward. A swing bracket 14 is attached to the support bracket 13 so as to be swingable about the longitudinal axis. A working device 4 is attached to the swing bracket 14.

As shown in FIG. 5, the working device 4 has a boom 15, an arm 16, and a bucket (a working tool) 17. The base portion of the boom 15 is pivotally attached to the swing bracket 14 so as to be rotatable about a horizontal axis (an axis extending in the machine width direction). In this manner, the boom 15 is configured to be freely swung upward and downward.

The arm 16 is pivotally attached to the tip end side of the boom 15 so as to be rotatable about the horizontal axis. In this manner, the arm 16 is configured to be freely swung forward and backward or upward and downward. The bucket 17 is provided on the tip end side of the arm 16 so as to perform the shoveling operation and the dumping operation.

Instead of or in addition to the bucket 17, it is possible for the working tool 1 to mount another working tool (an auxiliary attachment) that is configured to be driven by a hydraulic actuator.

Examples of other working tools (the auxiliary attachments) include a hydraulic breaker, a hydraulic crusher, an angle bloom, a ground auger, a pallet fork, a sweeper, a mower, a snow blower, and the like.

The swing bracket 14 is configured to be swung by the stretching and shortening of a swing cylinder that is provided in the machine body 2. The boom 15 is configured to be swung by the stretching and shortening of the boom cylinder C3. The arm 16 is configured to be swung by the stretching and shortening of the arm cylinder C4.

The bucket 17 is configured to freely perform the shoveling performance and the dumping operation due to the stretching and shortening of the bucket cylinder (the working tool cylinder) C5. Each of the dozer cylinder, the swing cylinder, the boom cylinder C3, the arm cylinder C4, and the bucket cylinder C5 is constituted of a hydraulic cylinder (a hydraulic actuator).

As shown in the drawings, an operation device 19L is provided on the left side of the operator seat 6 in the cabin 5, and an operation device 19R is provided on the right side of the operator seat 6.

Figure 1:
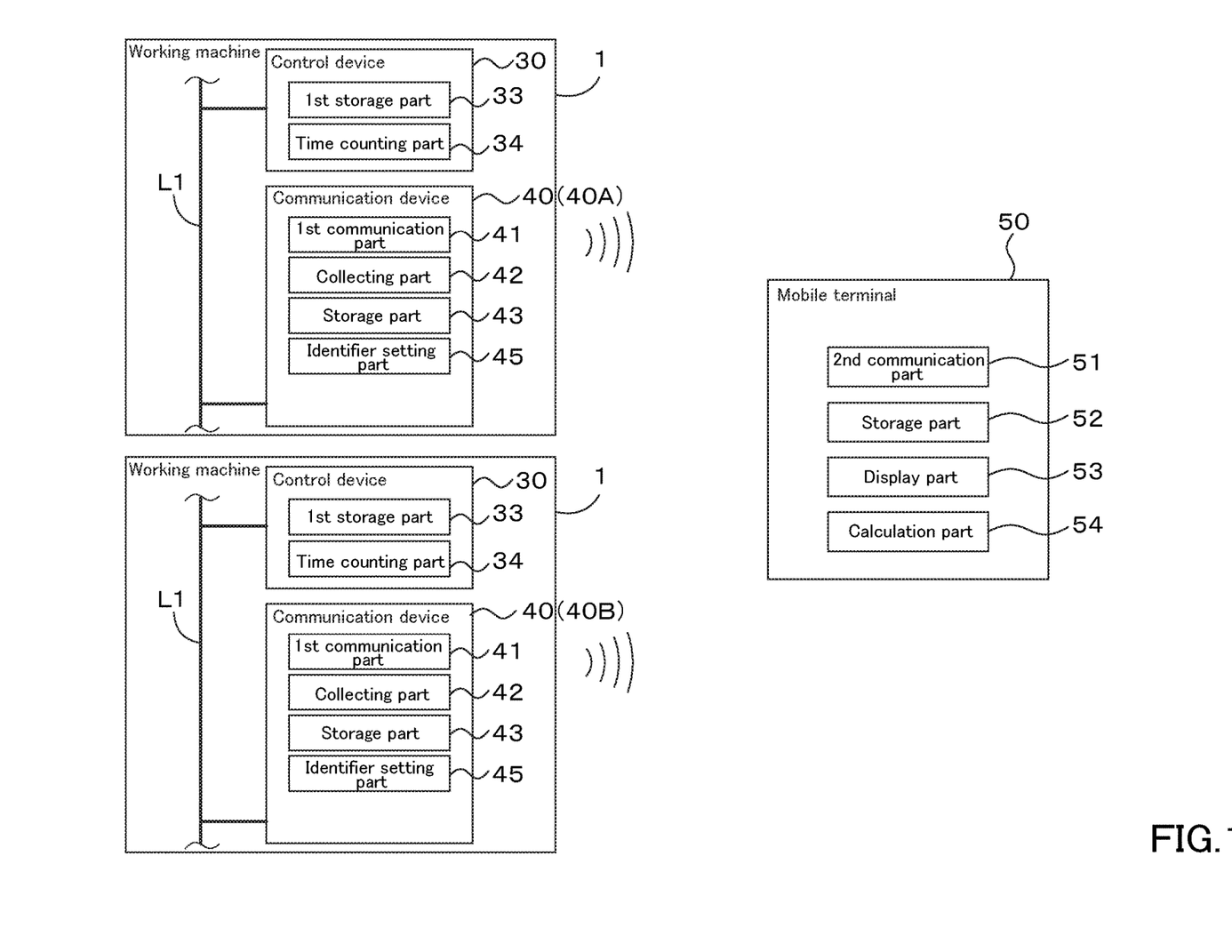
FIG. 1 is a schematic view of a data communication system for a working machine according to an embodiment of the present invention.

As shown in FIG. 1, the working machine 1 has a control device 30. The control device 30 is a device configured to perform the control relating to the working machine 1, and performs various controls such as, for example, the hydraulic control, the automatic idle control (the AI control), the boom height control, the arm height control, and the anti-theft control.

Various sensors are connected to the control device 30, and the values (the signals) detected by the sensors are inputted to the control device 30.

For example, an operation amount of the operation device (the operation device 19L, the operation device 19R) detected by a position sensor or the like, a governor angle (a governor position) detected by a governor sensor, an operation amount of the accelerator detected by a position sensor or the like, an engine revolution speed detected by the revolution sensor or the like, and an angle of the arm and an angle of the boom detected by the angle sensor or the like are inputted to the control device 30.

In the hydraulic control, the control device 30 outputs a control signal to the proportional solenoid valve or the like in accordance with the operation amounts of the operation devices 19L and 19R, and sets the opening degree of the proportional solenoid valve and thereby controls a flow rate control valve connected to the proportional solenoid valve. That is, in the hydraulic control, the flow rate control valve configured to control the hydraulic actuators (the swing cylinder, the boom cylinder C3, the arm cylinder C4, and the bucket cylinder) are controlled.

In the automatic idle control, when the control devices 19L and 19R are operated, the control device 30 outputs, to the engine, the control signal corresponding to the operation amount of the accelerator, and thereby increases and decreases the engine revolution speed. When the operation controllers 19L and 19R are not operated, the control device 30 outputs, to the engine, a control signal indicating the idling revolution speed is outputted to the engine, and thereby fixes the engine revolution speed to the idling state.

In the boom height control, when the height of the boom 15 reaches the upper limit value of the boom height preliminarily set in the boom height control, the control device 30 stops the upward moving of the boom 15 irrespective of the operations of the control devices 19L and 19R.

That is, in the boom height control, when the boom angle at the time of upward moving operation of the boom 15 reaches the upper limit value, the flow rate control valve corresponding to the boom cylinder C3 is controlled, and thereby the upward moving of the boom 15 is stopped.

In the angle control of the arm, when the angle of arm reaches the upper limit value or the lower limit value of the angle of arm angle (the arm angle) preliminarily set, the control device 30 controls the arm 16 to stop the scraping operation irrespective of the operations of the operation devices 19L and 19R.

That is, in the arm angle control, when the arm angle at the time of the scraping operation of the arm 16 reaches the upper limit value or the lower limit value, the control device 30 controls the flow rate control valve corresponding to the arm cylinder C4, and thereby stops the scraping operation of the arm 16.

In the anti-theft control, when authentication between the authentication information registered in advance (the second authentication information) and the authentication information (the first authentication information) transmitted from the outside such as the mobile terminal 50 is established, the control device 30 provides permission to start the prime mover E1 (the engine), and thereby drives the engine.

In addition, in the anti-theft control, when the authentication between the first authentication information and the second authentication information is not established, the control device 30 does not provide the permission of the engine start, and thereby does not start the engine.

As described above, the control device 30 is configured to perform various controls such as the hydraulic control, the automatic idle control (the AI control), the boom height control, the arm height control, the anti-theft control, and the like. Meanwhile, the controls described above are just the examples and are not limited, and the control device 30 executes necessary controls in accordance with to the modes of the working machine 1.

The control device 30 has a storage part (a storage device) 33 and a time counting part 34. The time counting part 34 is constituted of electric/electronic parts provided in the control device 30, programs stored in the control device 30, or the like. The time counting part 34 counts the operation time until the input of the engine revolution speed to the control device 30 is terminated from the time of starting to input, to the control device 30, the engine revolution speed detected by the engine rotation sensor (start of driving) until the engine revolution speed reaches the control device 30.

In other words, the time counting part 34 obtains, by a timer or the like, the time (the elapsed time) during which the engine is driven. For example, when the engine is driven continuously from 9 o'clock to 12 o'clock, the operation time (the elapsed time) is 3 hours. The time counting part 34 obtains the accumulated operation time (the hour meter) by accumulating the counted operation time every time when the engine is driven (from the start of driving the engine to the end of driving the engine).

In this embodiment, the accumulated value of the operation time from the start of driving the engine to the end of driving the engine is set as the accumulated operation time. However, the time during which the driven parts other than the engine is driven may be employed as the accumulated operation time (the hour meter), and the driving parts are not limited to the engine. The storage part 33 is constituted of a nonvolatile memory or the like, and is configured to store the accumulated operation time counted by the time counting part 34.

As shown in FIG. 1, the working machine 1 has a communication device 40. The communication device 40 is a device configured to output the data (the information) of the working machine 1 to the outside of the working machine 1 and to capture the external data to the working machine 1. The communication device 40 has a first communication part 41. The first communication part 41 is configured to be connected to the mobile terminal 50.

For example, the first communication part 41 can transmit, to the mobile terminal 50, a beacon of a communication scheme conforming to the Bluetooth (a registered trademark) Low Energy in the Bluetooth (a registered trademark) specification of the communication standard IEEE 802.15.1 series.

Figure 2A:
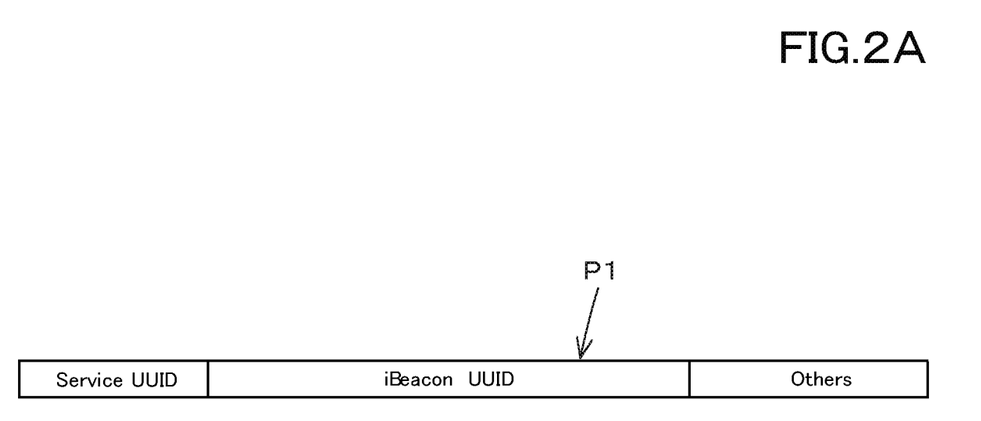
FIG. 2A is a schematic view of an advertisement packet P1 according to the embodiment.

The beacon transmitted by the first communication part 41 is the iBeacon (a registered trademark). As shown in FIG. 2A, the iBeacon includes an advertisement packet P1. The advertisement packet P1 includes a service UUID (a Service Universally Unique Identifier) and an iBeacon UUID that is the unique iBeacon.

An application identifier is set to the iBeaconUUID. The application identifier is information for identifying a plurality of prepared applications (the application software).

Figure 2B:
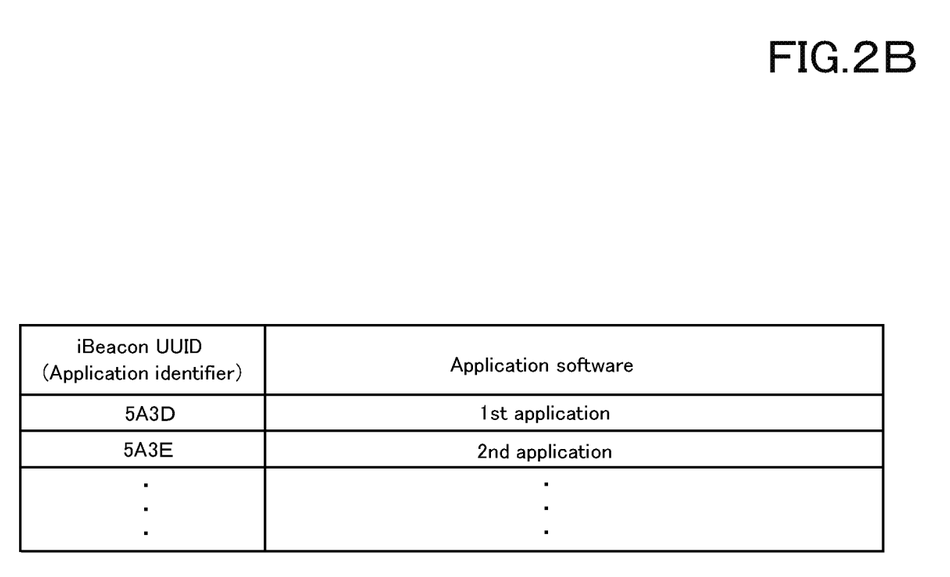
FIG. 2B is a view illustrating a relation between an application and an application identification according to the embodiment.

For example, as shown in FIG. 2B, a first application identifier for identifying a first application and a second application identifier for identifying a second application are prepared as the application identifier.

The first application and the second application are applications having functions (actions) different from each other, and are applications stored (memorized) in the mobile terminal 50. The first application and the second application are, for example, applications obtained by downloading from a predetermined server or the like to the mobile terminal 50.

Figure 2C:
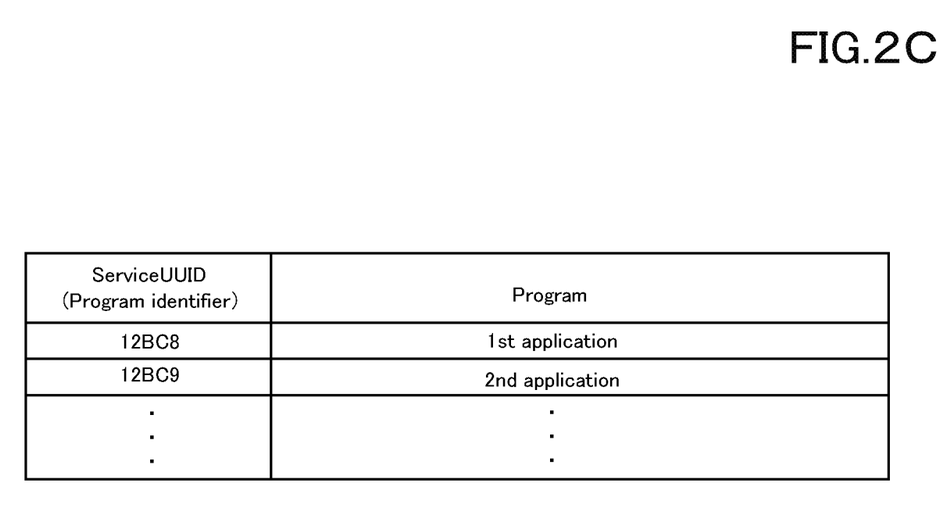
FIG. 2C is a view illustrating a relation between a program and a program identifier according to the embodiment.
Figure 2D:
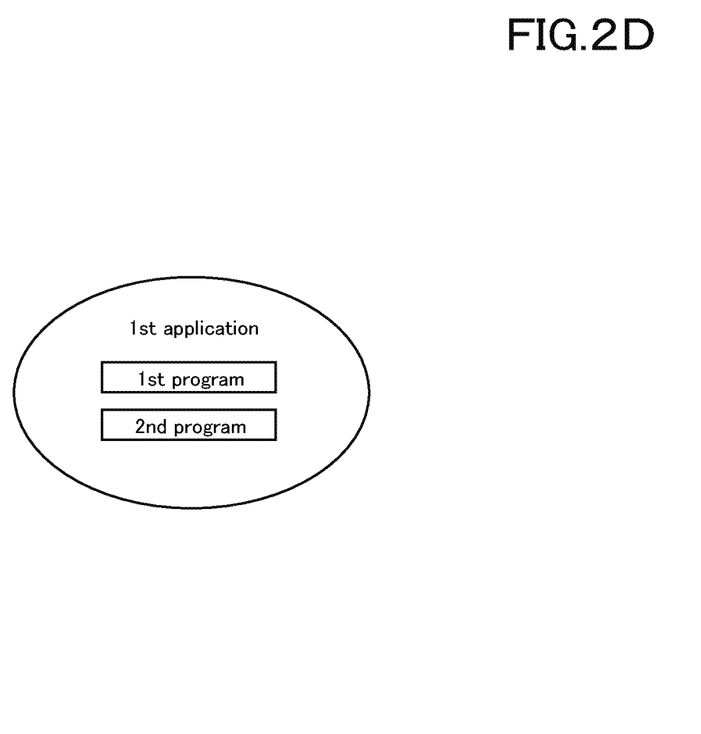
FIG. 2D is a view illustrating a relation between an application and a program according to the embodiment.

As shown in FIG. 2D, the first application has at least two programs, that is, the first program and the second program. The first program and the second program are programs having functions and the like different from each other, and are each the programs that can be executed independently from each other.

In this embodiment, the first program is, for example, a collecting program for collecting the machine information of the working machine, and the second program is a starting program for determining whether or not to start the driving part of the working machine.

A program identifier is set to the service UUID. The program identifier is information for identifying a program included in the application. As shown in FIG. 2C, in this embodiment, either one of the first program identifier identifying the first program and the second program identifier identifying the second program is set as the program identifier in the service UUID.

The communication device 40 includes a collecting part 42 and a storage part (a storage device) 43. The collecting part 42 is constituted of electric/electronic parts provided in the communication device 40, programs stored in the communication device 40, or the like.

The collecting part 42 is configured to collect the machine information on the working machine. In particular, the communication device 40, the control device 30 provided in the working machine 1, and the equipment such as a sensor are connected by a communication line L1 or the like, and the collecting part 42 obtains various signals flowing in the communication line L1 (the data) as the machine information.

In particular, the collecting part 42 collects, as the machine information, signals from various sensors, the accumulated operation time, and the like under a state where the controls such as the automatic idle control, the boom height control, the arm height control and the like are performed by the control device 30. In the embodiment mentioned above, the signal and the accumulated operation information of the case where the control device 30 is performing the controls are employed as the machine information. However, the machine information to be collected by the collecting part 42 is not limited to the above-mentioned those.

The collecting part 42 may collect, as the machine information, the information on malfunction and warning of the equipment mounted on the working machine 1, and may collect, as the machine information, the setting values and the like of the equipment of the working machine 1. That is, any information on the working machine 1 can be employed as the machine information.

The storage part 43 is constituted of a nonvolatile memory or the like, and is configured to temporarily store the machine information collected by the collecting part 42. The machine information temporarily stored in the storage part 43, that is, the machine information collected by the collecting part 42 is transmitted to the mobile terminal 50 by the communication device 40 (the first communication part 41).

The communication device 40 has an identifier setting part 45. The identifier setting part 45 is constituted of electric/electronic parts provided in the communication device 40, programs stored in the communication device 40, or the like.

The identifier setting part 45 sets the application identifiers corresponding to the plurality of applications. For example, in the case where the machine information stored in the storage part 43 is transmitted to the mobile terminal 50 or in the case of requiring the transmission of the first authentication information to the mobile terminal 50 for starting the driving part, the first application identifier corresponding to the first application is set to the iBeaconUUID.

In addition, the identifier setting part 45 sets the second application identifier to the iBeaconUUID, for example, in the case of executing the setting of the working machine.

In setting the first application identifier, the identifier setting part 45 sets, to the service UUID, the first program identifier corresponding to the first program which is a collecting program for collecting the machine information in the case where the machine information is transmitted to the mobile terminal 50.

Also, in setting the first application identifier, the identifier setting part 45 sets, to the service UUID, the second program identifier corresponding to the second program that is a starting program for judging whether or not the starting part of the working machine is started in the case of requesting the mobile terminal 50 to transmit the first authentication information for starting the driving part.

That is, the identifier setting part 45 (the communication device 40) sets, as the service UUID, any one of the first program identifier corresponding to the first program and the second program identifier corresponding to the second program.

The mobile terminal 50 is a tablet computer, a smartphone, a PDA, or the like, and may be a mobile terminal that is portable. The mobile terminal 50 is configured to be connected to the communication device 40 provided in the working machine 1, and is configured to transmit and receive the various data (the various information) to and from the communication device 40. The mobile terminal 50 has the second communication part 51.

The second communication part 51 is constituted of a communication module or the like for performing the short-range communication or the long-range communication, and is configured to perform the wireless communication with the communication device 40 in, for example, the Bluetooth (a registered trademark) Low Energy or the like in the specification of the Bluetooth (a registered trademark) of the communication standard IEEE 802.15.1 series.

The second communication part 51 is configured to receive the beacon (the advertisement packet P1) transmitted from the communication device 40. Meanwhile, the second communication part may be configured to perform the wireless communication in the mobile phone communication network, the data communication network, or the like.

The mobile terminal 50 includes a storage part (a storage device) 52, a display part (a display device) 53, and a calculation part (a calculation device) 54. The storage part 52 is a nonvolatile memory, and is configured to store the machine information received from the communication device 40, the various application software (the various applications), an operation system (an OS) such as the iOS, and the like.

The display part 53 is configured to display the various information, and is constituted of a liquid crystal panel or the like. The calculation part 54 is constituted of a CPU, electric/electronic parts and the like provided in the mobile terminal 50. And, the calculation part 54 performs various types of processing of the mobile terminal 50.

For example, the calculation part 54 activates any one of the first application and the second application, and executes the first program and the second program.

Meanwhile, the single mobile terminal 50 can execute a predetermined program on the basis of the beacon transmitted from the plurality of communication devices 40 (the first communication device 40A and the second communication device 40B).

Figure 3:
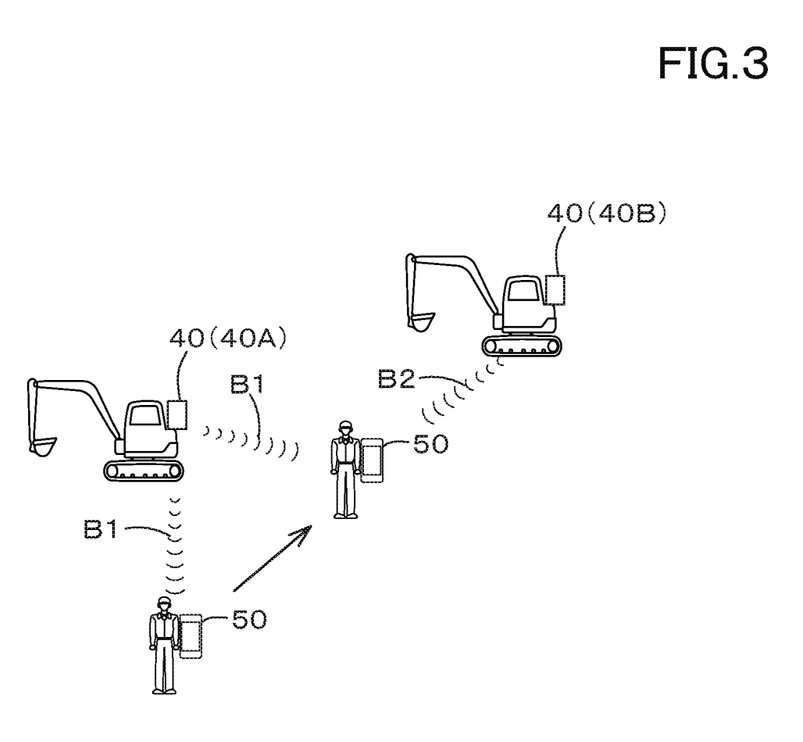
FIG. 3 is a view illustrating a state where a first communication device and a second communication device transmit beacons to a mobile terminal according to the embodiment.

FIG. 3 is a view showing a state where a beacon is being transmitted, to the single mobile terminal 50, from the first communication device 40A provided in a working machine 1A and the second communication device 40B provided in the working machine 1B. For convenience of the explanation, the beacon transmitted by the first communication device 40A will be referred to as "a first beacon B1", and the beacon transmitted by the second communication device 40B will be referred to as "a second beacon B2" in the explanation of the embodiment.

As shown in FIG. 3, in the case where the first beacon B1 outputted from the first communication device 40A is received, the program identifier included in the first beacon B1 is referred to. In the case where the program identifier included in the first beacon B1 is the first program identifier, the calculation part 54 of the mobile terminal 50 executes the first program corresponding to the first program identifier.

Next, when the mobile terminal 50 receives the second beacon B2 under the condition where the second communication device 40B is transmitting the second beacon B2 while the mobile terminal 50 is executing the first program, the program identifier included in the second beacon B2 is referred to. In the case where the program identifier is the second program identifier, the mobile terminal 50 executes the second program corresponding to the second program identifier.

That is, in the case of FIG. 3, the first communication part 41 of the first communication device 40A transmits the first beacon B1 including the first program identifier set by the identifier setting part 45. The first communication part 41 of the second communication device 40B transmits, to the mobile terminal, the second program identifier set by the identifier setting part 45 with use of the second beacon B2 after the mobile terminal 50 receives the first beacon B1.

On the other hand, the second communication part 51 of the mobile terminal 50 receives the first beacon B1 and the second beacon B2, and the calculation part 54 executes the first program corresponding to the first program identifier included in the first beacon B1 and executes the second program corresponding to the second program identifier included in the second beacon B2.

That is, the mobile terminal 50 is configured to execute a predetermined program on the basis of each of the first beacon B1 which is at least one of the plurality of beacons and the second beacon B2 that is a beacon other than the first beacon B1.

Figure 4:
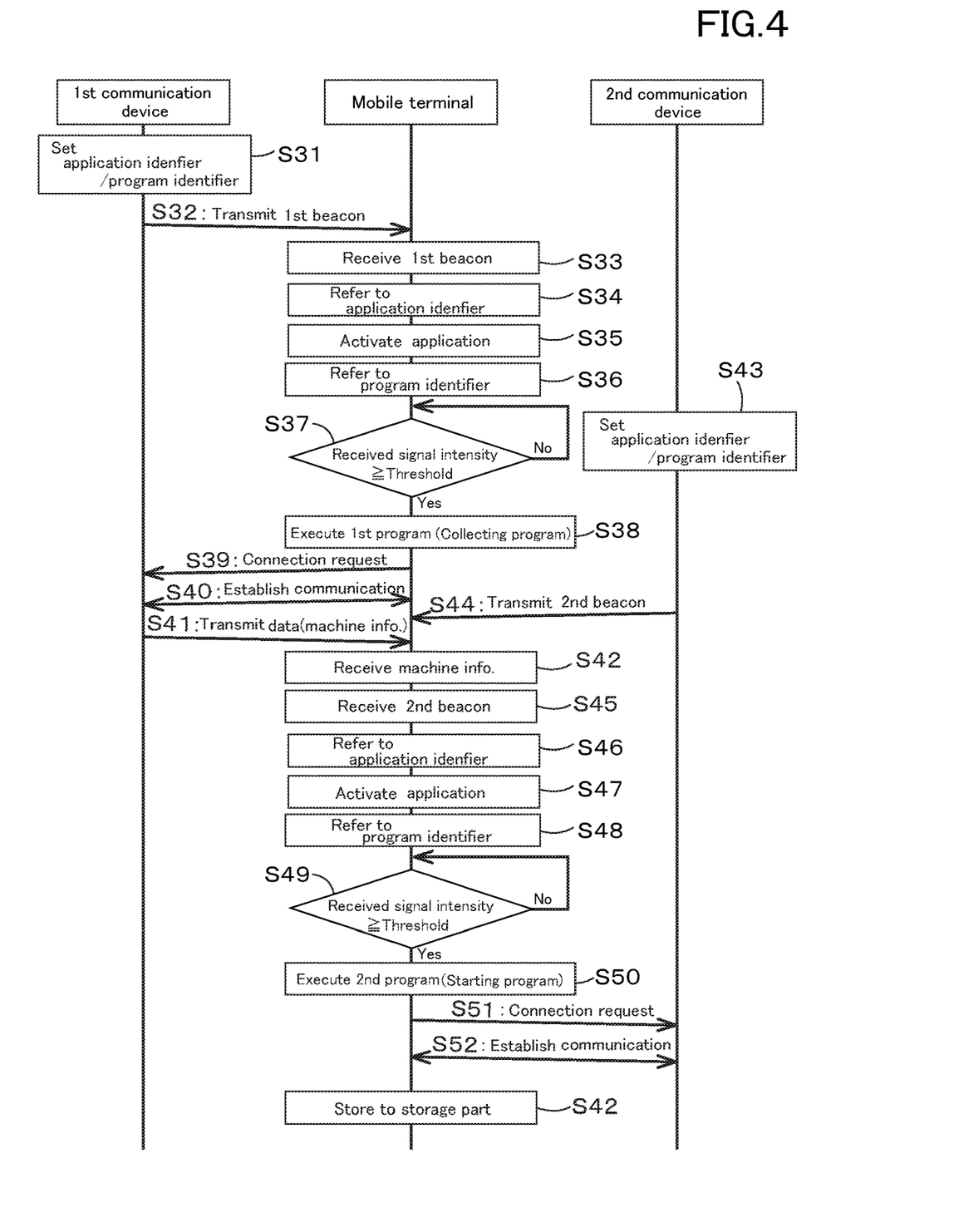
FIG. 4 is a view illustrating a flowchart showing a flow in which the communication device and the second communication device each connect to the mobile terminal according to the embodiment.

FIG. 4 shows a flowchart in which the mobile terminal 50 connects to the first communication device 40A and the second communication device 40B and executes the processing. With reference to FIG. 4, the processing of the first communication device 40A and the second communication device 40B will be described in detail.

The identifier setting part 45 of the first communication device 40A sets the application identifier and the program identifier (step S31: the identifier setting process).

In the identifier setting processing S31, in the case where the data capacity of unsent information not yet transmitted to the mobile terminal 50 of all the machine information in the storage part 43 is equal to or larger than a predetermined value for example, a first application identifier is assigned to the iBeaconUUID of the advertisement packet P1, and the first program identifier is assigned to the service UUID of the advertisement packet P1.

Upon completion of the identifier setting processing S31, the first communication device 40A transmits the first beacon B1 including the first application identifier and the first program identifier to the outside (step S32).

In the case where the mobile terminal 50 exists in the communication area of the first beacon B1, the second communication part 51 receives the first beacon B1 (step S33).

The calculation part 54 of the mobile terminal 50 refers to the application identifier included in the advertisement packet P1 (step S34).

In the case where the application identifier is the first application identifier, the calculation part 54 activates the first application corresponding to the first application identifier of the first application and the second application preliminarily stored in the mobile terminal 50 (step S35).

In addition, the calculation part 54 of the mobile terminal 50 refers to the program identifier included in the advertisement packet P1 (step S36).

In the case where the program identifier is the first program identifier, the calculation part 54 schedules the execution of the first program corresponding to the first program identifier from among the first program and the second program included in the first application.

Here, in the case where the received signal intensity of the first beacon B1 is equal to or higher than the threshold value (step S37, Yes), the calculation part 54 executes the first program scheduled to be executed (step S38).

That is, in the case where the received signal intensity of the first beacon B1 is equal to or higher than the threshold value, the mobile terminal 50 executes the first program corresponding to the first program identifier.

The mobile terminal 50 issues a connection request to the first communication device 40A by executing the first program (step S39), and when the bidirectional communication is established between the first communication part 41 of the first communication device 40A and the second communication part 51 of the mobile terminal 50 (step S40), the machine information corresponding to the first program of the mobile terminal 50 is transmitted to the mobile terminal 50 (step S41: the data transmission process).

Upon receiving the machine information (step S42), the mobile terminal 50 stores, in the storage part 52, the machine information as the information acceptable by the first program.

As described above, under the state where step S31 to step S42 are being performed, the second communication device 40B executes the processing independently from the first communication device 40A.

In particular, the identifier setting part 45 of the second communication device 40B sets the application identifier and the program identifier (step S43: the identifier setting process).

In the identifier setting process S43, in the case where the prime mover E1 is not started and the transmission of the mobile terminal 50 is requested to the mobile terminal 50, the first application identifier is set to the iBeaconUUID of the advertisement packet P1, and the second program identifier is set to the service UUID of the advertisement packet P1.

Upon completion of the identifier setting process S43, the second communication device 40B transmits, to the outside, the second beacon B2 including the first application identifier and the second program identifier (step S44).

Here, the transmission of the second beacon B2 to the outside may be performed during the execution of the first program of the mobile terminal 50.

That is, the mobile terminal 50 executes the first program to receive the machine information from the first communication device 40A and to transmit the second beacon B2 even while the received machine information is being stored.

In the case when the mobile terminal 50 is present in the communication area of the second beacon B2, the second communication part 51 receives the second beacon even while receiving the machine information or while the mobile terminal 50 is performing the processing for storing the machine information (step S45).

The calculation part 54 of the mobile terminal 50 refers to the application identifier included in the advertisement packet P1 (step S46).

In the case where the application identifier is the first application identifier, since the first application corresponding to the first application identifier is already being executed, the calculation part 54 of the mobile terminal 50 refers to the program identifier included in the advertisement packet P1 (step S47).

In the case where the program identifier is the second program identifier, the calculation part 54 schedules the execution of the second program corresponding to the second program identifier from among the first program and the second program included in the first application.

That is, in the case where the program identifier present after receiving the second beacon B2 is different from the program identifier corresponding to the program that is already being executed, the calculation part 54 schedules the execution of a program corresponding to the program identifier included in the second beacon B2.

Here, in the case where the received signal intensity of the second beacon B2 is equal to or higher than the threshold value (step S48, Yes), the calculation part 54 executes the second program scheduled to be executed (step S49).

That is, in the case where the received signal intensity of the second beacon B2 is equal to or higher than the threshold value, the mobile terminal 50 executes the second program corresponding to the second program identifier.

The mobile terminal 50 issues the connection request to the second communication device 40B by executing the second program (step S50), and upon establishment of the bidirectional communication between the first communication part 41 of the second communication device 40B and the second communication part 51 of the mobile terminal 50 (step S51), the communication device 40 requests the mobile terminal 50 to transmit the first authentication information.

Upon receiving the request for transmitting the first authentication information, the mobile terminal 50 transmits the first authentication information stored in the storage part 43 to the communication device 40.

The control device 30 of the working machine 1B permits the start of the engine in the case where the authentication between the first authentication information transmitted from the outside such as the mobile terminal 50 and the second authentication information registered in advance are established with each other, and thereby the engine is driven.

In addition, in the case where the authentication between the first authentication information and the second authentication information is not established, the control device 30 of the working machine 1B does not permit the start of the engine, and thus does not start the engine.

As described above, the mobile terminal 50 can activate the application and execute the program in accordance with the first beacon B1 transmitted from the first communication device 40A and the second beacon B2 transmitted from the second communication device 40B.

In the embodiment described above, either one of the first program or the second program is executed in the case where the received signal intensity of the beacon is equal to or higher than the threshold value. However, either one of the first program and the second program may be executed depending on the received signal intensity.

That is, each of step S37 and step S48 shown in FIG. 4 may be omitted.

In the embodiment described above, the first communication device 40A and the second communication device 40B transmit program identifiers different from each other to the mobile terminal 50. However, the first communication device 40A and the second communication device 40B may transmit the same program identifier to the mobile terminal 50.

In other words, the program identifier transmitted by the second communication device 40B may be the program identifier transmitted from the first communication device 40A that transmitted the program identifier earlier.

In the embodiment described above, the identifier setting part 45 sets the first program identifier in the case where the data capacity of the unsent information that has not been transmitted to the mobile terminal 50 is equal to or larger than a predetermined value. However, in the case where at least the data to be transmitted to the mobile terminal 50 remains, the identifier setting part 45 may set the first program identifier.

In the embodiment described above, the program is exemplified by the collecting program and the starting program, but is not limited thereto. For example, the program may be an informing program for notifying the mobile terminal 50 of the notifying information such as a warning of the working machine.

In this case, the identifier setting part 45 sets a program identifier corresponding to the notification program. The communication device 40 transmits, to the mobile terminal 50, the program identifier already set. After the communication between the mobile terminal 50 and the communication device 40 is established, the communication device 40 transmits notifying information such as a warning to the mobile terminal 50. After receiving the notifying information, the mobile terminal 50 displays the notifying information transmitted from the working machine (the communication device 40).

In this manner, the work machine can display the warning or the like on the mobile terminal 50 by sending a notification identifier to the mobile terminal 50 in the case of notifying the mobile terminal 50 of information something to be notified.

In addition, the numbers of programs and applications are not limited to the example described above, and may be two or more, three or more, or further more.

As described above, the communication system for the working machine includes a plurality of communication devices 40A and 40B disposed on the working machine 1 and configured to transmit the beacon including at least either one of the first program identifier and the second program identifier, and the mobile terminal 50 configured to receive the beacon. After receiving the first beacon B1 which is at least one of the plurality of beacons transmitted from the plurality of communication devices 40A and 40B, the mobile terminal 50 executes the first program corresponding to the first program identifier included in the first beacon B1. In addition, in the case where the mobile terminal 50 receives the second beacon B2 which is a beacon different from the first beacon B1 during the execution of the first program, the mobile terminal 50 executes the second program corresponding to the first program identifier included in the second beacon B2.

According to that configuration, each of the first program and the second program of the mobile terminal 50 can be executed on the basis of the program identifiers included in the beacons B1 and B2 transmitted individually by the plurality of communication devices 40A and 40B. In other words, the mobile terminal 50 is configured to execute the second program on the basis of the beacon B2 to perform the processing even while the mobile terminal 50 is executing the first program.

After execution of the first program, the mobile terminal 50 connects to the first communication device 40A that has transmitted the first beacon B1, of the plurality of communication devices 40A and 40B, and after execution of the second program, the mobile terminal 50 connects to the second communication device 40B that has transmitted the second beacon B2, of the plurality of communication devices 40A and 40B.

In this manner, in accordance with the first program, the mobile terminal 50 is connected to the first communication device 40A that has transmitted the beacon B1 including the first program identifier, and then in accordance with the second program, the mobile terminal 50 is connected to the second communication device 40B that has transmitted the beacon B2 including the second program identifier. That is, the mobile terminal 50 is configured to connect to the second communication device 40B to perform the processing while connecting to the first communication device 40A.

In the case where the received signal intensity of the second beacon B2 is equal to or higher than the threshold value, the mobile terminal 50 executes the second program corresponding to the second program identifier.

According to that configuration, it is possible to execute the second program when approaching the working machine 1B provided with the second communication device 40B.

The communication device 40 sets, as the service UUID, one of the first program identifier corresponding to the first program and the second program identifier corresponding to the second program.

In this manner, it is possible to execute the first program and the second program at an arbitrary timing while identifying either one of the first program and the second program on the basis of the service UUID.

The mobile terminal 50 configured to be connected to the communication device 40 provided in the working machine includes the second communication part 51 configured to receive the first beacon B1 which is at least one of the plurality of beacons transmitted from the plurality of communication devices 40A and 40B and the second beacon B2 which is a beacon different from the first beacon B1 and includes the calculation part 54 configured to execute the first program corresponding to the first program identifier included in the first beacon B1 and to execute a second program corresponding to the second program identifier included in the second beacon B2.

In this manner, each of the first program and the second program of the mobile terminal 50 can be executed on the basis of the program identifiers included in at least two beacons B1 and B2. That is, even while the mobile terminal 50 is executing the first program, the mobile terminal 50 can execute the second program on the basis of the beacon B2 to perform the processing.

After execution of the first program, the second communication part 51 connects to the first communication device 40A that has transmitted the first beacon B1, of the plurality of communication devices 40A and 40B, and after execution of the second program, the second communication part 51 connects to the second communication device 40B that has transmitted the second beacon B2, of the plurality of communication devices 40A and 40B.

In this manner, in accordance with the first program, the mobile terminal 50 is connected to the first communication device 40A that has transmitted the beacon B1 including the first program identifier, and then in accordance with the second program, the mobile terminal 50 is connected to the second communication device 40B that has transmitted the beacon B2 including the second program identifier.

That is, the mobile terminal 50 is configured to connect to the second communication device 40B to perform the processing while connecting to the first communication device 40A.

The second communication part 51 receives one of the first program identifier and the second program identifier that are set as the service UUID. The calculation part 54 determines to execute either one of the first application and the second program in accordance with the service UUID.

According to that configuration, it is possible to execute the first program and the second program at an arbitrary timing while identifying either one of the first program and the second program on the basis of the service UUID.

The communication device 40 for the working machine disposed on the working machine 1 and configured to be connected to the mobile terminal 50, includes the identifier setting part 45 configured to set at least one of the first program identifier and the second program identifier, and the first communicating part 41 configured to transmit, to the mobile terminal 50, the first program identifier set by the identifier setting part 45 with the first beacon B1 and the second program identifier set by the identifier setting part 45 with the second beacon B2. The first communicating part 41 is configured to transmit the second beacon B2 to the mobile terminal 50 while the mobile terminal 50 executes the first program after receiving the first beacon B1, the first program corresponding to the first program identifier being included in the first beacon B1.

According to that configuration, each of the first program and the second program of the mobile terminal 50 can be executed on the basis of the program identifiers included in the beacons B1 and B2 individually transmitted by each of the plurality of communication devices 40A and 40B.

That is, even while the mobile terminal 50 is executing the first program, the second program can be executed on the basis of the beacon B2 to perform the processing.

The identifier setting part 45 sets, as the service UUID, either one of the first program identifier corresponding to the first program and the second program identifier corresponding to the second program as the service UUID.

According to that configuration, it is possible to execute the first program and the second program at an arbitrary timing while identifying either one of the first program and the second program on the basis of the service UUID.

A communication processing method for working machines which connects the plurality of communication devices 40A and 40B disposed on the plurality of working machines 1A and 1B to the mobile terminal 50 configured to connect to the plurality of communication devices 40A and 40B, includes steps of transmitting the first beacon B1 from the first communication device 40A of the plurality of communication devices 40A and 40B, executing the first program when the mobile terminal 50 receives the first beacon B1, the first program corresponding to the first program identifier included in the first beacon B1, transmitting, to the mobile terminal 50, the second beacon B2 from the second communication device 40B of the plurality of communication devices 40A and 40B other than the first communication device 40A while the mobile terminal 50 activates the first program, and executing the second program when the mobile terminal 50 receives the second beacon B2, the second program corresponding to a second program identifier included in the second beacon B2.

According to that configuration, each of the plurality of first program and second program of the mobile terminal 50 can be executed on the basis of the program identifiers included in the beacons B1 and B2 individually transmitted by the plurality of communication devices 40A and 40B.

That is, even while the mobile terminal 50 is executing the first program, the mobile terminal 50 can execute the second program on the basis of the beacon B2 to perform the processing.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A communication system for a working machine, comprising:
    a first communication device disposed on a first working machine to transmit a first beacon including a first program identifier corresponding to a first program;
    a second communication device disposed on a second working machine to transmit a second beacon including a second program identifier corresponding to a second program that is different from the first program; and
    a mobile terminal to receive the first beacon and the second beacon, and then to execute the first program and the second program,
    wherein the mobile terminal executes the second program when receiving the second beacon having a signal intensity equal to or greater than a threshold intensity.

2. The communication system according to claim 1, wherein the first program is configured to connect the mobile terminal to the first communication device for collecting machine information of the first working machine.

3. The communication system according to claim 1, wherein the second program is configured to connect the mobile terminal to the second communication device for transmitting a first authentication information of the mobile terminal to the second communication device, and
    wherein the second communication device permits the mobile terminal to start a prime mover of the second working machine when the first authentication information of the mobile terminal is authenticated with a second authentication information of the second working machine.

4. The communication system according to claim 1, wherein the first communication device defines the first program identifier as a service universal unique identifier of the first beacon, and
    wherein the second communication device defines the second program identifier as another service universal unique identifier of the second beacon.

5. The communication system according to claim 1, wherein each of the first communication device and the second communication device includes,
    an identifier setting circuitry to define at least either one of the first program identifier and the second program identifier, and
    a first communicating circuitry to transmit at least either one of the first beacon and the second beacon to the mobile terminal,
    wherein the first communicating circuitry of the first communication device transmits the first beacon so that the mobile terminal executes the first program, and
    wherein the first communicating circuitry of the second communication device transmits the second beacon so that the mobile terminal executes the second program.

6. The communication system according to claim 5, wherein each of the identifier setting circuitries defines at least either one of the first program identifier and the second program identifier as a service universal unique identifier.

7. The communication system according to claim 1, wherein the mobile terminal executes the first program and the second program in parallel.

8. A mobile terminal to be connected to first and second communication devices disposed on first and second working machines, respectively, the mobile terminal comprising:
    a second communicating circuitry to receive a first beacon including a first program identifier corresponding to a first program transmitted from the first communication device and a second beacon including a second program identifier corresponding to a second first program transmitted from the second communication device, the first program and the second program being different from each other; and
    a processing circuitry to execute the first program and the second program when the second communicating circuitry receives the first beacon and the second beacon,
    wherein the processing circuitry executes the second program when second communicating circuitry receives the second beacon having a signal intensity equal to or greater than a threshold intensity.

9. The mobile terminal according to claim 8, wherein the first program is configured to connect the mobile terminal to the first communication device for collecting machine information of the first working machine.

10. The mobile terminal according to claim 8, wherein the second program is configured to connect the mobile terminal to the second communication device for transmitting a first authentication information of the mobile terminal to the second communication device, and
    wherein the second communication device permits the mobile terminal to start a prime mover of the second working machine when the first authentication information of the mobile terminal is authenticated with a second authentication information of the second working machine.

11. The mobile terminal according to claim 8, wherein the second communicating circuit receives the first program identifier and the second program identifier, each of which is defined as a service universal unique identifier.

12. The mobile terminal according to claim 11, wherein the processing circuitry determines either one of the first program and the second program to be executed, in accordance with the service universal unique identifier.

13. The mobile terminal according to claim 8, wherein the first program and the second program are executed in parallel.

14. A communication processing method for working machines, comprising:

transmitting a first beacon including a first program identifier corresponding to a first program from a first communication device disposed on a first working machine to a mobile terminal;

receiving the first beacon to execute the first program by the mobile terminal;

transmitting a second beacon including a second program identifier corresponding to a second program from a second communication device disposed on a second working machine to the mobile terminal, the first program and the second program being different from each other; and receiving the second beacon to execute the second program by the mobile terminal, wherein the mobile terminal executes the second program when receiving the second beacon having a signal intensity equal to or greater than a threshold intensity.

15. The communication processing method according to claim 14, wherein the first program is configured to connect the mobile terminal to the first communication device for collecting machine information of the first working machine.

16. The communication processing method according to claim 14, wherein the second program is configured to connect the mobile terminal to the second communication device for transmitting a first authentication information of the mobile terminal to the second communication device, and wherein the second communication device permits the mobile terminal to start a prime mover of the second working machine when the first authentication information of the mobile terminal is authenticated with a second authentication information of the second working machine.

17. The communication processing method according to claim 14, further comprising:

defining the first program identifier as a service universal unique identifier in the first communication device; and defining the second program identifier as another service universal unique identifier in the second communication device.

18. A communication system for a working machine, comprising:

a first communication device disposed on a first working machine to transmit a first beacon including a first program identifier corresponding to a first program;

a second communication device disposed on a second working machine to transmit a second beacon including a second program identifier corresponding to a second program that is different from the first program; and a mobile terminal to receive the first beacon and the second beacon, and then to execute the first program and the second program, wherein the second program is configured to connect the mobile terminal to the second communication device for transmitting a first authentication information of the mobile terminal to the second communication device, and wherein the second communication device permits the mobile terminal to start a prime mover of the second working machine when the first authentication information of the mobile terminal is authenticated with a second authentication information of the second working machine.

19. A mobile terminal to be connected to first and second communication devices disposed on first and second working machines, respectively, the mobile terminal comprising:

a second communicating circuitry to receive a first beacon including a first program identifier corresponding to a first program transmitted from the first communication device and a second beacon including a second program identifier corresponding to a second program transmitted from the second communication device, the first program and the second program being different from each other; and a processing circuitry to execute the first program and the second program when the second communicating circuitry receives the first beacon and the second beacon, wherein the second program is configured to connect the mobile terminal to the second communication device for transmitting a first authentication information of the mobile terminal to the second communication device, and wherein the second communication device permits the mobile terminal to start a prime mover of the second working machine when the first authentication information of the mobile terminal is authenticated with a second authentication information of the second working machine.

20. A communication processing method for working machines, comprising:

transmitting a first beacon including a first program identifier corresponding to a first program from a first communication device disposed on a first working machine to a mobile terminal;

receiving the first beacon to execute the first program by the mobile terminal;

transmitting a second beacon including a second program identifier corresponding to a second program from a second communication device disposed on a second working machine to the mobile terminal, the first program and the second program being different from each other; and receiving the second beacon to execute the second program by the mobile terminal, wherein the second program is configured to connect the mobile terminal to the second communication device for transmitting a first authentication information of the mobile terminal to the second communication device, and wherein the second communication device permits the mobile terminal to start a prime mover of the second working machine when the first authentication information of the mobile terminal is authenticated with a second authentication information of the second working machine.

* * * * *